United States Patent [19]

Suggs

[11] Patent Number: 5,148,412

[45] Date of Patent: Sep. 15, 1992

[54] DIVER GUIDANCE METHOD AND SYSTEM
[75] Inventor: Robert B. Suggs, New Iberia, La.
[73] Assignee: American Oilfield Divers, Inc., Broussard, La.
[21] Appl. No.: 729,715
[22] Filed: Jul. 10, 1991

Related U.S. Application Data

[63] Continuation-in-part of Ser. No. 658,706, Feb. 21, 1991, Pat. No. 5,079,753.
[51] Int. Cl.$^5$ ............................................. H04B 11/00
[52] U.S. Cl. .................................... 367/131; 367/107; 367/910
[58] Field of Search ...................... 367/87, 92, 99, 103, 367/106, 107, 113, 118, 129, 131, 133, 907, 910

[56] References Cited

U.S. PATENT DOCUMENTS

| | | | |
|---|---|---|---|
| 3,045,206 | 7/1962 | Ahrens et al. | 367/910 |
| 3,800,273 | 3/1974 | Rolle | 367/910 |
| 4,010,619 | 3/1977 | Hightower et al. | 367/106 |
| 4,102,203 | 7/1978 | Sylvester et al. | 73/620 |
| 5,077,703 | 12/1991 | Strauss | 367/910 |

OTHER PUBLICATIONS

Saltzer, B., "A Deep Submergence Divers' Navigation System," Navigation: Journal of the Institute of Navigation, vol. 17, #1, 1970.

Primary Examiner—Ian J. Lobo
Attorney, Agent, or Firm—Mason, Fenwick & Lawrence

[57] ABSTRACT

The present invention relates to a method and system for generating signals which represent a map that depicts one or more submerged objects within an underwater area; detecting acoustic energy emitted from means carried by a diver within said underwater area, or scanning said area with sonar energy, to develop signals which indicate the location of said diver within said area; and combining said diver location signals with said map representing signals for producing a composite visual display to said diver which shows his location with respect to the location of one or more submerged map objects within said area. A remote station also may be provided at which several of these functions are performed.

31 Claims, 4 Drawing Sheets

DIVER GUIDANCE METHOD AND SYSTEM

This application is continuation-in-part of application Ser. No. 07/658,706 (U.S. Pat. No. 5,079,753) filed on Feb. 21, 1991 for "Diver Orientation Apparatus And Method," by the same inventor, Robert Suggs.

FIELD OF THE INVENTION

The present invention relates to a method and system for providing visual aids to a diver in an underwater area for helping him to navigate with reference to submerged objects which appear on a map of the underwater area, especially when there is little or no underwater visibility. The present invention is particularly but not exclusively useful in locating or verifying objects such as pipelines or their components which are buried below the bottom of the sea or other body of water, and also has general utility for many other underwater tasks which require diver attendance at the site of the object.

BACKGROUND OF THE INVENTION

The sea and ocean bottoms of the world have experienced a great deal of transformation over the past few decades. For example, large numbers of well heads, pipelines and platforms have been constructed during the offshore exploration of continental shelves for oil and gas in major bodies of water such as the Gulf of Mexico and the North Sea. In addition to such man-made facilities, which also have included undersea communication cables, the sea bottoms have been disturbed by the results of war, accidents and natural occurrences.

In order to generate and maintain records of such construction and other man-made or natural phenomena, sea and ocean surveying has been extensively conducted over the years to develop drawings, maps and other descriptions of surface and underwater boundaries and objects in areas of economic and other importance. For example, waters offshore of many countries have been divided into sectors or blocks which can be used as legal descriptions of their locations in which valuable deposits of oil, gas and other minerals may be found. The location of existing surface and submerged objects, such as platforms and buried pipelines, is also required for various reasons including the safe positioning and construction of new offshore facilities.

However, surveying during the early years of offshore exploration and cable laying was quite difficult and prone to considerable error due to a lack of known fixed points on which to base measurements and because of other factors. Drawings and maps were often made from imprecise knowledge of a vessel's or buoy's position because of inaccurate navigation systems or the action of wind and waves, as well as from faulty surveying equipment or operator error.

Although the recent use of laser surveying equipment and satellite navigation techniques has promoted better accuracy in making new offshore drawings and maps, many older maps still in use are often incorrect in varying degrees. Such older "as built" drawings can have errors of many feet in regard to the actual location of a specific point thereon. Moreover, when navigating a vessel to a specific site, even the most modern satellite navigation systems can be off a number of feet, thus potentially resulting in the vessel being a substantial distance away from the actual location of the map object.

Such flawed maps, imperfect navigational systems, personnel operating errors and adverse sea action, therefore, can create significant expense and waste valuable time when trying to locate a specific map object for repair, modification or removal, especially when the object is underwater and requires a diver to conduct a search therefor. Underwater diving operations for many purposes can be hampered by the lack of visibility due to the turbidity or depth of water in which the diver finds himself, or because a submerged object is also buried below the sea bottom or mud line. This is especially true if the diver is attempting to locate a submerged object which is some distance away from his current position and cannot be seen. With zero or near zero water visibility, a diver also can become confused and disoriented so that he does not know north, south or other directions.

One striking example of the problems encountered under such circumstances is when the diver is attempting to locate, or to verify the map location of, a submerged object buried beneath the sea bottom like a pipeline or a valve component thereof. For example, if a barge is laying a new pipeline near to or over an existing buried pipeline, a diver must first find the exact location of the existing pipeline in order to avoid damage to these facilities. It also may be that a buried pipeline valve needs repair or replacement by a diver who must search for and find this valve. In one prior art procedure for accomplishing this sub-bottom "search and find" mission, the dive support vessel is navigated to a "fix" point at the assumed geographical location of the buried pipeline valve shown on the relevant "as built" map of the offshore area. A bottom-weighted buoy is usually deployed to mark the vessel's "fix" at this map location. The diver, who is typically weighted down, then descends to the sea bed and is provided with a search line of predetermined length which is attached to the buoy weight. He next walks in a circle while holding the line taut, after which another section of line may be added and a larger circle walked. While moving, the diver repeatedly probes the sea bottom with a rod until the buried pipeline valve is discovered.

However, this well known search method is very often performed with the diver in a state of disorientation and loss of direction because of the lack of underwater visibility. If the sea bottom is relatively soft or is overlaid with layers of silt, a diver often finds himself knee-deep in sand or mud while walking which can be physically exhausting. He also is at a great disadvantage if the vessel's navigational "fix" or the "as built" area map has inaccuracies. Many real time diving hours are expended to no avail due to inaccurate information. Moreover, his time on the bottom for deep dives is very limited and he must be regularly brought to the surface in a controlled manner to avoid getting decompression sickness before diving again at some later time.

Another current search technique for locating underwater objects lying on top of a sea bed is to place a sonar transmitter/receiver on the sea bottom so that sonic waves reflected from the diver and such objects are shown as echo images on a shipboard or other remote station monitor. Based on the location of these monitored images which represent the diver and objects to be located, a remote station operator then gives audio commands to the diver via a telephone cable in an effort to guide or direct his movements to these objects. However, such remote audio guidance also has not proven to be particularly efficient either in diver time or effort because of the directional disorientation he experiences due to a lack of visibility. Furthermore, submerged objects which are buried below the mud line or sea bottom will not be detected by sonar beam energy and thus cannot be displayed to the remote operator.

A U.S. Pat. No. 3,045,206 (Ahrens et al) also shows the use of a self-contained sonic transducer/CRT device which is carried by a diver to help him locate underwater objects whose sonar images he views on the CRT screen that may be either outside or inside his helmet. A sonar device with similar functions is also shown in U.S. Pat. No. 3,800,273 (Rolle). However, the Ahrens and Rolle devices do not also permit the diver to view an image of himself in relation to other object images nor will they detect buried or sub-bottom objects. In U.S. Pat. No. 4,102,203 (Sylvester et al), the signals from an underwater ultrasonic testing transducer operated by a diver are transmitted to a remote station for analysis and visual display, from whence visual image test result signals are sent back to the diver for display on his own monitor; however, the Sylvester system is not designed for nor capable of locating the position of underwater objects and directing the diver thereto.

Other guidance methods and means are shown in U.S. Pat. No. 3,541,717 (Grayson) and in an article by Saltzer entitled "A Deep Submergence Divers' Navigation System," *Navigation*, Vol. 17, No. 1, Spring 1970, pp. 76–82. The Grayson patent is concerned with fish seining operations wherein a search boat sonar unit displays to the search boat operator the position of a body of fish while a purse boat transponder also displays the purse boat's location to the search boat operator, so that the search boat operator can verbally radio a course of travel to the purse boat for directing it to a position where the fish can be caught. The Saltzer article describes a diver's navigation system which visually displays several pieces of information to the diver, e.g., the relative bearing from his location to one or more active pinging acoustic beacons, and his bearing relative to an omnidirectional acoustic broadcasting array. Neither Grayson or Saltzer, however, can assist a diver in locating unmarked objects buried beneath the sea bottom.

Thus, it is very important to create the most efficient conditions possible when conducting underwater "search and find" operations, particularly if the objects searched for are hidden from view under the sea bed. The present invention addresses and overcomes many problems encountered by a diver because it provides map directional information to the diver in finding his way to submerged objects under adverse conditions or in navigating within an underwater area for whatever reasons.

SUMMARY OF THE PRESENT INVENTION

Accordingly, it is a primary purpose of the present invention to provide visual aids to a diver in an underwater area for enabling him to locate a submerged object that is depicted in a map of said area.

Another purpose of the present invention is to provide a method and system whereby either acoustic tracking or sonar detection of a diver in an underwater area presents him with a real time visual display of his location with respect to the location of a submerged object depicted in a map of said area.

A further purpose of the present invention is to provide a method and system for developing signals which indicate the location of a diver within an underwater area, combining said diver location signals with signals representing a map that depicts a submerged object within said area, and visually displaying said combined signals to the diver for enabling him to locate said submerged object.

These and other purposes of the present invention are achieved by generating signals which represent a map that depicts one or more submerged objects within an underwater area; detecting acoustic energy emitted from means carried by a diver within said underwater area, or scanning said area with sonar energy, to develop signals which indicate the location of said diver within said area; and combining said diver location signals with said map representing signals for producing a composite visual display to said diver which shows his location with respect to the location of one or more submerged map objects within said area. A remote station also may be provided at which several of these functions are performed.

DETAILED DESCRIPTION OF PREFERRED EMBODIMENTS

Figure 1:
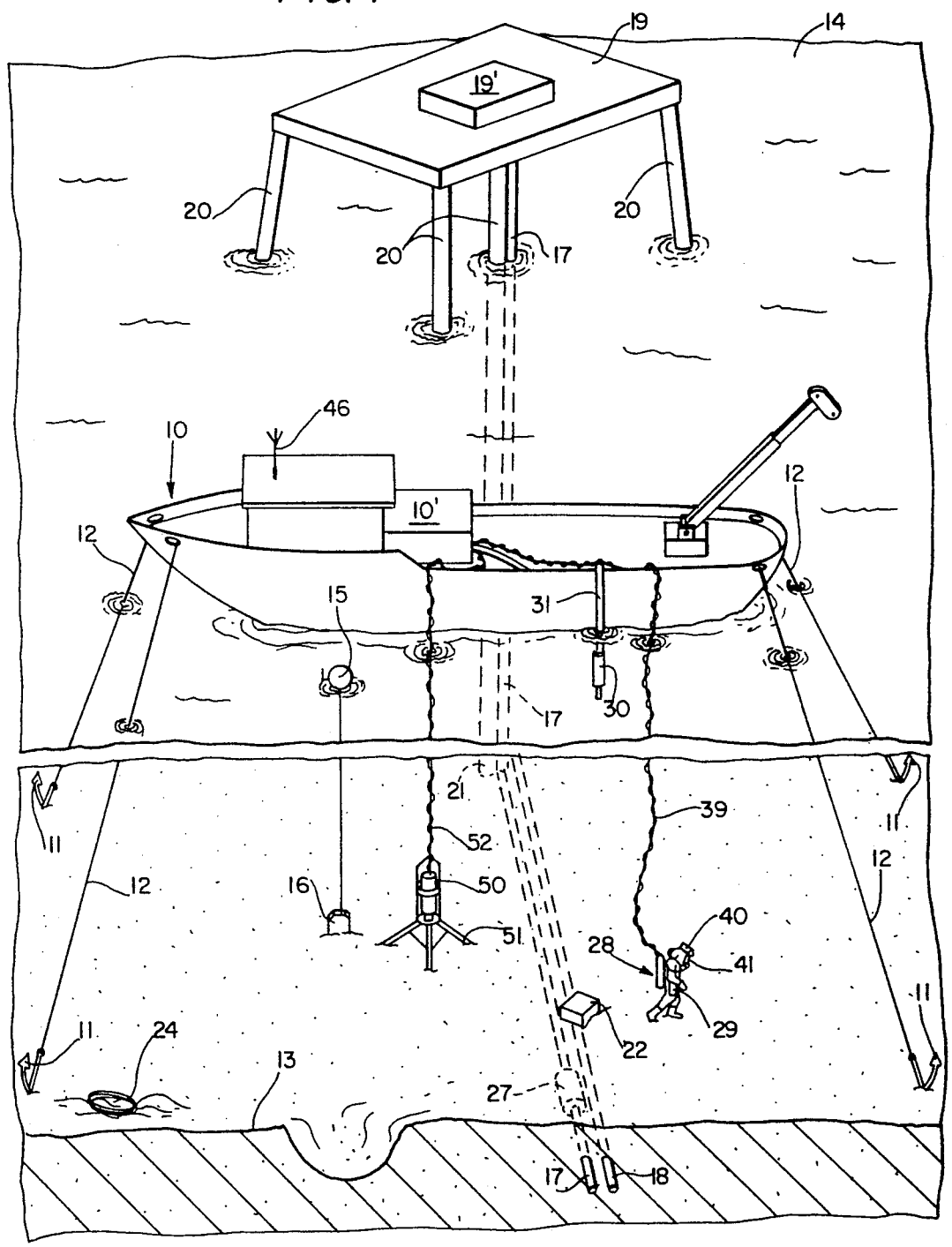
FIG. 1 is a diagrammatic perspective view of a surface vessel and an underwater diver during the process of locating a buried object according to the subject invention.

In describing the preferred embodiments of the subject invention illustrated in the drawings, specific terminology is used for the sake of clarity However, the invention is not intended to be limited to the specific terms so selected, and each specific term includes all technically equivalent terms for steps or devices operating in a similar manner to accomplish a similar purpose.

Figure 2:
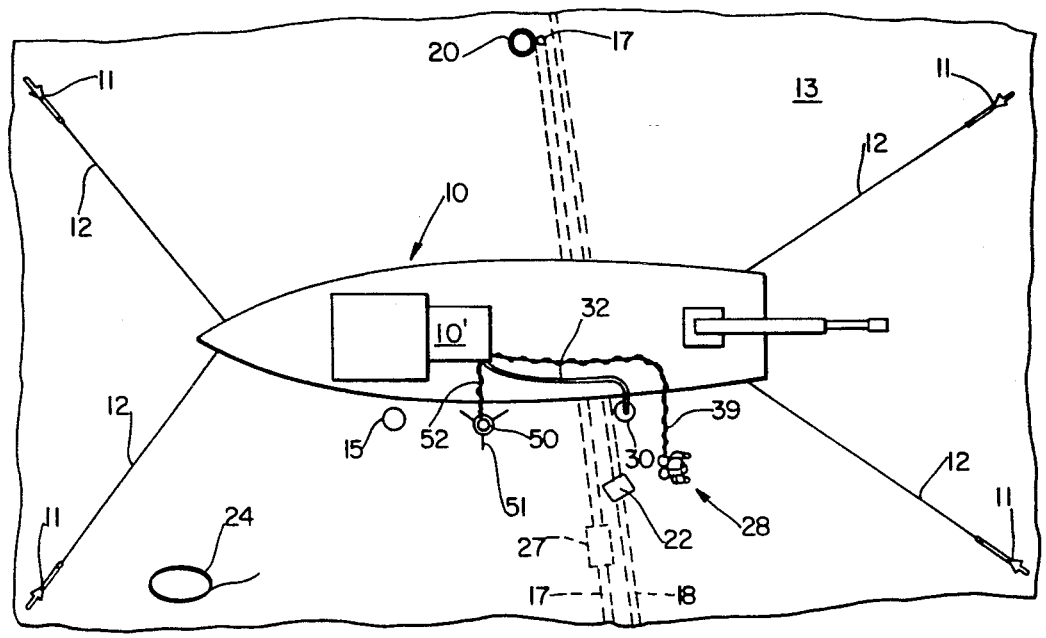
FIG. 2 is a diagrammatic plan view of the site depicted in FIG. 1.

FIGS. 1 and 2 (not to scale) illustrate one of the many uses of the subject invention in guiding a diver to find a submerged pipeline buried beneath the sea bottom of a body of water such as the Gulf of Mexico.

FIG. 1 is a diagrammatic perspective view and FIG. 2 is a diagrammatic plan view showing a surface dive support vessel 10 which is fixed in place by four anchors 11 and their lines 12 extending from the vessel to the sea bottom 13. As is typical for many offshore drilling sites located miles from the Gulf of Mexico coastline, sea bottom 13 may be at a depth below the water surface 14 where human visibility is virtually zero. A buoy 15 anchored by a weight 16 may also be used to mark the vessel's site after it arrives.

Also depicted in FIG. 1 and in FIG. 2 are submerged gas or oil pipelines 17 and 18 which are buried under sea bottom 13 and extend between a pump house 19' on a production platform 19 and terminal facilities (not shown) on shore. Platform 19 is supported above water by a group of legs 20 whose lower ends 21 are firmly set into the sea bottom 13. Legs 20 also are typically braced by cross members not shown in the drawings.

FIGS. 1 and 2 further show various man-made debris objects lying on sea bed 13 that are here assumed to have been deposited as a result of drilling or production activities in the general vicinity. For example, this debris may include a battery 22 and a coil of wire rope 24 which fell from or were thrown off platform 19 or other vessels during drilling or production operations.

Pipeline 17 is also shown in FIGS. 1 and 2 to include a buried remote operated valve 27 which, over time, may require repair or replacement. If so, a diver 28 is typically lowered from vessel 10 to locate this valve and perform the necessary work thereon.

The present invention utilizes various techniques and equipment to assist diver 28 in locating the buried sub-bottom pipeline 17 and its valve 27. In one embodiment, the diver is equipped with an underwater acoustic tracking beacon 29, typically but not necessarily battery operated, which emits appropriate acoustic energy signals that are detected by a hydrophone 30. Beacon 29 can be either a self-activated pinger or a transponder which emits an acoustic energy signal in response to an acoustic energy interrogation signal from hydrophone 30. Hydrophone 30 may be temporarily suspended under water by a pipe 31 or other mounting device from the side of vessel 10, or it may be permanently attached to the vessel's bottom. The hydrophone converts the detected beacon acoustic signals into electrical signals which are transmitted by electrical cable 32 to an acoustic tracking system 33 in FIG. 3 which is located, for example, in cabin 10' on vessel 10.

Figure 3:
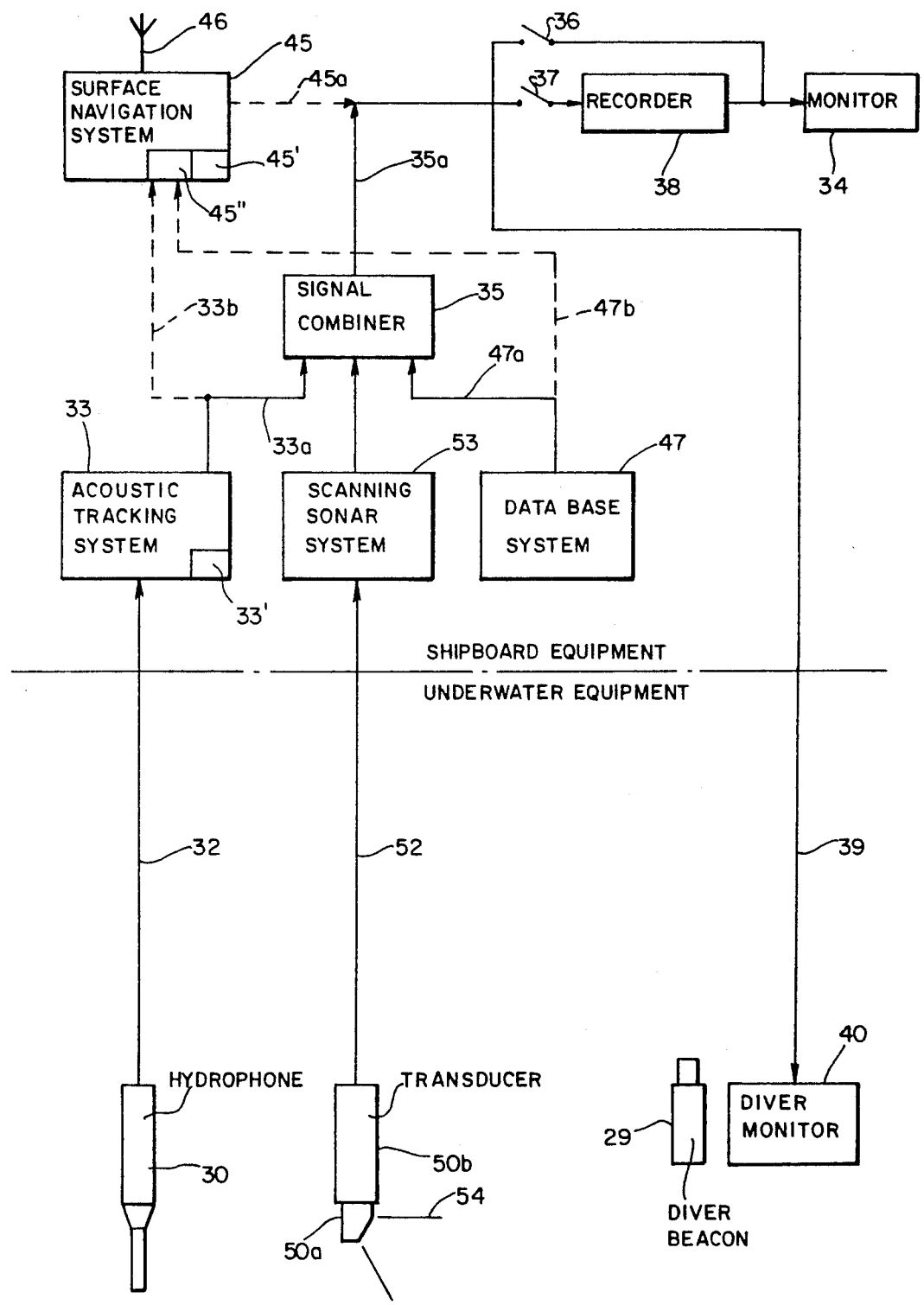
FIG. 3 is a schematic block diagram of the shipboard remote station equipment and the underwater devices used in the subject invention.
Figure 6:
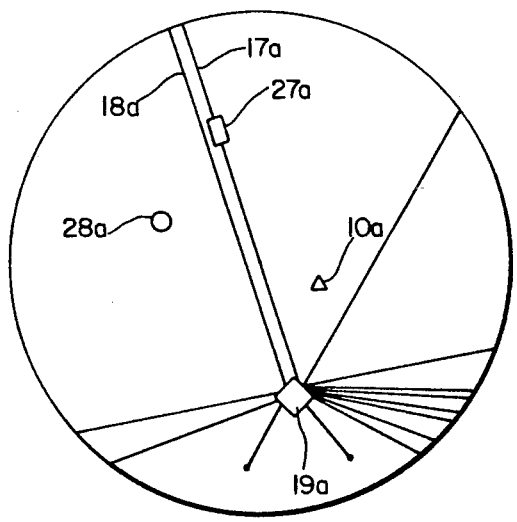
FIG. 6 depicts a composite display image viewed by a diver according to one embodiment of the subject invention, which shows the underwater location of the diver as determined by an acoustic tracking system, and part of the FIG. 5 pipeline map.

Tracking system 33 in the remote shipboard station of FIG. 3 may, for example, comprise commercially available equipment such as the Trackpoint II Underwater Tracking System manufactured by Ferranti O.R.E., Inc. of Falmouth, Mass. In conjunction, for example, with a Ferranti Model 4610 hydrophone and a Ferranti Model 4320 MultiBeacon operating in its transponder mode, which are respectively used as components 30 and 29 in FIGS. 1-3, the Trackpoint II system processes the received beacon information and generates signals used by its internal display screen 33' to visually indicate the location of diver 28 by his range and bearing with respect to some reference point such as vessel 10. This Trackpoint II visual indication of the diver's location can also be displayed on another shipboard monitor 34 in FIG. 3, to which the tracking system processed output signals may be conveyed via connection 33a, a video signal mixer or combiner 35, connection 35a, and switch 36. FIG. 6 (not to scale) illustrates this tracking system display on remote monitor 34, wherein the triangular graphical symbol 10a represents the location of vessel 10 and circular symbol 28a represents the location of diver 28. If desired, the tracking system display signals transmitted via combiner 35 may also or alternatively be passed via switch 37 to a videotape or other type of recorder 38 in order to make a permanent record of the tracking system 33 output and the outputs of other systems connected to combiner 35. Additional remote monitors also may be located on shore or elsewhere to receive, by wireless or other means, the same signals as are received by monitor 34. Furthermore, other suitable acoustic tracking systems are also available for use in the present invention.

Figure 4:
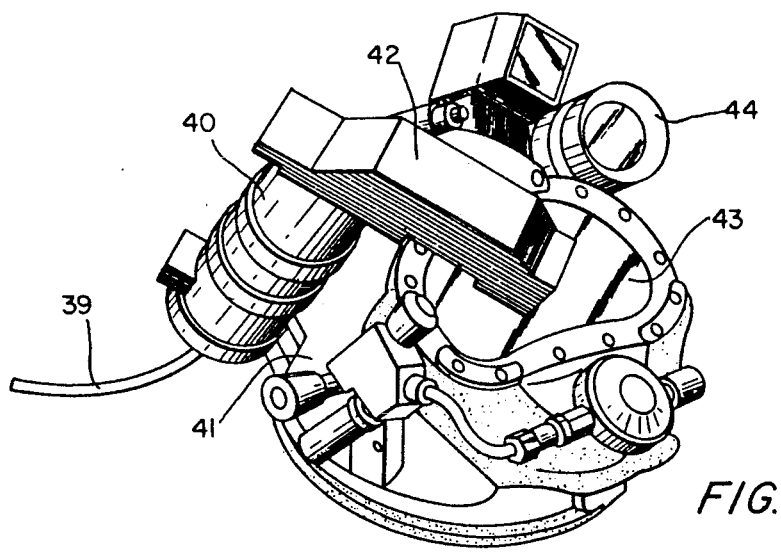
FIG. 4 is a perspective view of a diving helmet with a small visual display monitor mounted thereon.

The tracking system 33 display signals are also transmitted via combiner 35 and an electrical cable 39 to a small closed circuit video monitor 40 that is mounted o the outside of helmet 41 of diver 28, as diagrammatically shown in FIG. 1 and in the perspective view of FIG. 4. Thus, the FIG. 6 tracking system visual display of the vessel and diver locations also appears on helmet monitor 40. By means of a folding mirror or prism arrangement 42 on helmet 41, this helmet monitor display can be viewed by the diver through the helmet glass window or face plate 43. Helmet 41, with its attached monitor 40 and viewing prism arrangement 42, has been previously used in connection with other underwater diving activities, including the practice of the underwater ultrasonic testing method disclosed in the aforementioned U.S. Pat. No. 4,102,203, and in the use of the diver orientation invention of the aforementioned related U.S. patent application Ser. No. 07/658,706, filed Feb. 21, 1991 by the present inventor. If desired, a small television camera 44 may also be mounted on helmet 41 to permit the remote station operator to observe what the diver is seeing and doing.

Acoustic tracking systems like Trackpoint II also are often interfaced with a surface navigation system, as represented by block 45 with antenna 46 in FIG. 3. Modern navigation systems incorporating computers and monitors include those employing GPS position fixes and similar techniques, whereby satellites are utilized to determine the location of a vessel at sea. Such satellite-based positioning systems are exemplified by the STARFIX system of John E. Chance & Associates, Inc. (Houston, Tex.), and the Differential GPS system of Wimpol Limited (Swindon, England). Positioning information from such navigation systems may be used to provide geographical coordinates for the diver tracking data generated by tracking system 33.

Figure 5:
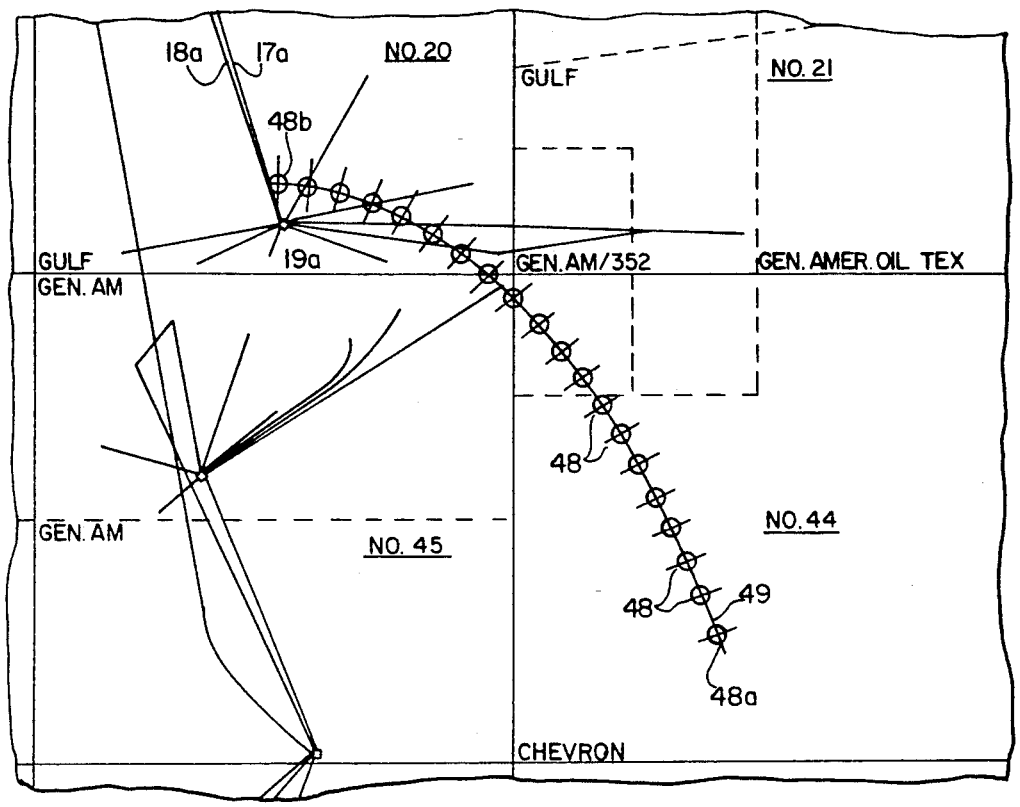
FIG. 5 is a fragment of a pipeline map of an offshore oil and gas field area in the Gulf of Mexico.

As further shown in FIG. 3, a data base system 47 is also provided at the remote station on vessel 10, or elsewhere if communication means are available to utilize the data base information at the diving site. This data base system 47 stores information which, for example, is depicted on one or more "as built" maps showing the presumed location of known pipelines, well heads, platforms and other surface and underwater facilities found in offshore areas. FIG. 5 illustrates a fragment of such a map issued by the government's Minerals Management Service and which indicates the previously surveyed locations of pipelines, platforms and related structures within government lease sectors No. 20, No. 21, No. 44 and No. 45 of the West Cameron Area in the Gulf of Mexico. For the purpose of describing the present invention, it is here assumed that platform 19 and buried pipelines 17 and 18 in FIG. 1 are located in Sector No. 20 of the FIG. 5 map as respectively indicated by numbers 19a, 17a, and 18a thereon. The series of circles 48 and curved line 49 on the FIG. 5 map have also been added to indicate the initial movements of dive support vessel 10 within this area, as will later be described.

Data base system 47 in FIG. 3 may, for example, comprise commercially available equipment such as the Dynamic Graphics System developed by the aforementioned John E. Chance & Associates, Inc., although other suitable data base systems are also available. Data base system 47 output signals are produced by the stored FIG. 5 or other map information and are used, via connection 47a and signal combiner 35, to visually display such information in graphical form on the remote shipboard monitor 34 and on the diver monitor 40 in FIG. 3. FIG. 6 also shows an enlarged selected portion of the FIG. 5 map information while it is being concurrently displayed on these monitors along with an overlay of the vessel and diver indicators 10a and 28a obtained from tracking system 33. By so superposing the diver indicator and map data, the diver's real time location with reference to pipeline 17 and valve 27 will immediately be apparent to the diver as well as to the observer of remote monitor 34. This information will enable the diver to go directly to valve 27, as shown by map location 27a, in the shortest possible time.

Signal combiner 35 in FIG. 3 is merely illustrative of a multi-image overlay function which may, for example, be provided by means similar to the video mixer component in FIG. 45 on page 850 of Volume 4 of the *Encyclopedia of Physical Science and Technology* (1987), or by any appropriate hardware or software equivalent thereof.

An operation will now be described which utilizes the method and system of the embodiment as described above. It is assumed that the buried pipeline valve 27 in FIG. 1, which is located under water of zero visibility in lease Sector No. 20 of the map area shown in FIG. 5, must be replaced by a diver 28 from vessel 10 which is initially located in lease Sector No. 44 at position 48a. With the aid of its navigation system 45, vessel 10 is moved from Sector No. 44 to an anchored site 48b in Sector No. 20 that is approximately over the presumed valve location as best as can be determined by the ship's captain from the information available to him. The curved line of circles 48 in FIG. 5 represents the route taken by vessel 10 and its various positions therealong during its passage to Sector No. 20.

It also is assumed that the "as built" pipeline map information of FIG. 5 has been stored in the data base system 47 of FIG. 3, along with specifications of the old valve 27 to be replaced and of the new replacement valve. Diver 28, who is equipped with his helmet monitor 40 and the acoustic beacon 29, now descends to sea bottom 13. As he walks, his real-time location on the sea bed is continuously determined by hydrophone 30 and tracking system 33 which graphically displays the relative positions of the diver and vessel on ship monitor 34 and diver monitor 40. At the same time, data system 47 is activated to concurrently display a graphical representation of its relevant pipeline map information on these same monitors. Therefore, both the diver and any remote monitor observer can visually see where the diver is currently located with respect to the presumed location of pipeline 17 and valve 27 as depicted on the map display. This combined display to the diver 28 of his current position and the valve's map location will enable him to follow t most direct path or route to the sea bottom point underneath which the valve 27 is presumably buried, because the diver's displayed acoustic symbol 28a will only move toward the displayed valve map location 27a when the diver is actually walking in the direction of the valve.

After his arrival at the bottom location on the map display where the buried valve 27 is thought to be, it may also be necessary for diver 28 to probe a small surrounding area with a rod or other suitable tool before the valve can be found since "as built" maps are not generally precise. He then can uncover the valve and, if desired, compare it with its specifications as displayed on his monitor 40 from data base system 47. These specifications can be substituted for the FIG. 6 display if called for. However, should valve 27 not be found after a reasonable probing time because of gross map errors, or if its actual design is different from the stored database specifications therefor which may indicate that the pipeline owner has ordered a search for the wrong valve, the diving company may be able to justify a cost increase over the original contract if the search must be extended or otherwise modified. Specifications of the new replacement valve and its installation instructions may also be transmitted to the diver's monitor from the data base 47 so that the diver does not have to rely only on his memory to perform the task at hand.

Although FIG. 3 was described above with reference to monitor 34 and signal combiner 35, alternative arrangements also are possible. For example, surface navigation system 45 may include a monitor 45' connected to the system's navigation computer 45" for displaying location and other navigational data needed for positioning the vessel 10. This monitor 45' also may display map information of the type shown in FIG. 5 which is used when the vessel is being moved to a new position. Such map information might be stored in computer 45", for example, or obtained by system 45 by way of an alternative connection 47b from data base system 47. Additionally, the diver tracking data from system 33 system 45 and there combined in or by computer 45" with the FIG. 5 map information to present a composite or overlay display on monitor 45' like that shown in FIG. 6. These combined or composite signals which drive monitor 45' can further be sent from navigation system 45 to diver monitor 40 by way of an alternative connection 45a and cable 39.

Moreover, while acoustic tracking system 33 is a relatively economical way of determining the underwater location of a diver, an underwater sonar acoustic scanning system may alternatively or even additionally be employed for this purpose and/or to provide other capabilities. One such sonar scanning system has been described in detail in the aforementioned related U.S. patent application Ser. No. 07/658,706, where it is used to assist a diver in following an underwater route to a submerged object that can be detected from reflected sonar energy. In FIGS. 1 and 2 of the present application, for example, an underwater scanning sonar transducer 50 may be lowered from vessel 10 to sea bottom 13 where it rests, for example, on an appropriate tripod stand 51 that keeps the transducer in a fixed position on bottom 13. In some cases, however, transducer 50 may be suspended or otherwise located at some distance above the sea bed. Sonar transducer 50, which is electrically connected by cable 52 to the remote station on vessel 10, preferably should be able to horizontally scan or sweep 360° around its vertical axis so that its transmitted sonar energy beam will impinge on and reflect from objects on bottom 13 at all points of the compass. However, a sector scan of less than 360° may be permissible or appropriate for some purposes.

Figure 7:
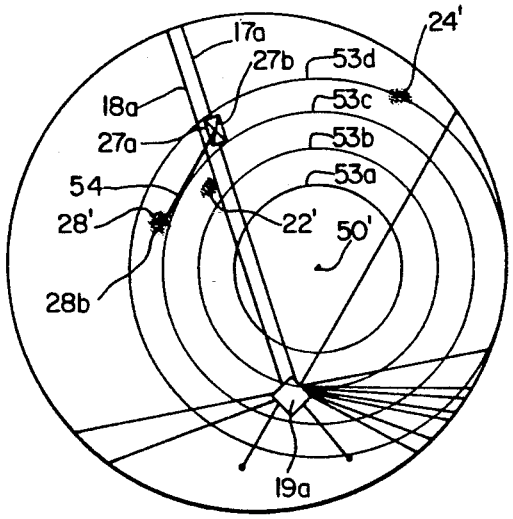
FIG. 7 depicts another composite display image viewed by a diver according to a second embodiment of the subject invention, which shows the underwater location of the diver as determined by a scanning sonar system, and part of the FIG. 5 pipeline map.

The reflected sonar beam is also preferably received by the same transducer 50 and there converted into electrical signals which are transmitted by cable 52 to a scanning sonar system 53 located in cabin 10' on vessel 10, as shown in FIG. 3. This system 53 receives and processes the transducer signals to generate signals used, via signal combiner 35 which also receives map information from data base system 47, to display a visual polar or plan view image on the shipboard monitor 34 and on diver monitor 40. As shown in FIG. 7, this sonar image display on these monitors is generally equivalent to a radar plan position indicator display and contains spots or pips 22′ and 24′ which indicate the relative underwater locations of debris such as battery 22 and coil 24 within the range of the underwater sonar beam. The diver's sonar image 28′ will also appear in this FIG. 7 sonar display. Although sub-bottom buried objects like pipelines 17 and 18 in FIG. 1 will not be detected by the sonar beam, their respective map locations 17a and 18a do appear in this monitor display along with the sonar images. The center or origin 50′ of the sonar image in FIG. 7 represents the underwater location of transducer 50.

Sonar system 53 also may add to the displayed FIG. 7 sonar image a series of visible range circles 53a–53d and other information according to the capabilities of the system. For example, an operator at the remote shipboard station can add or incorporate a visible target heading or route line 54 between the displayed monitor screen position of diver sonar pip 28′ at his starting underwater location and any other screen position within the sonar display of FIG. 7, whether or not a sonar object pip appears at said other position. Thus, when data base system 47 is also activated, the remote operator can create line 54 between diver pip 28′ and the concurrently displayed target map valve symbol 27a. This line 54 represents the most direct path or route that the diver can take to reach valve 27 from his starting location. Line 54 also remains fixed in place on his monitor's sonar image display while the diver moves toward valve 27.

Additionally, the remote station operator of sonar system 53 also can superimpose a visible cursor or marker symbol 28b on diver sonar pip 28′ of any appropriate size and shape (here shown as a small cross in FIG. 7), and he can further superimpose a similar or different visible cursor 27b on the map symbol 27a at the other end of route line 54. Cursors 28b and 27b thus visibly mark or highlight the diver sonar pip 28′ and the valve map symbol 27a (or a point pipeline symbol 17a where the valve is assumed to be located). As the diver image pip 28, thereafter moves in response to subsequent movement of diver 28 from his starting location, however, both cursor 28b and route line 54 remain fixed in place on the displayed sonar image. Thus, if for any reason the diver moves away from the route represented by line 54 as he is attempting to move to valve 27, his pip 28′ also departs from line 54 and such digression will be immediately apparent to him from monitor 40 so that he can make a corrective turn back to the path. However, displayed routes and object cursors, while extremely beneficial, are not needed in all applications for the diver to follow a path from his starting location to the target object, and displayed routes themselves may take forms other than a straight line. Computer-generated symbols or other indicators may also replace sonar object images for the purpose of displaying to the diver his underwater location and the location of other objects.

Commercially available sonar apparatus which is particularly suitable for use as the sonar system 53 is the Model 971 Color Imaging Sonar System manufactured by Mesotech Systems of Port Coquitlan, B.C., Canada. In particular, components of this Mesotech system include the 971 rotary scanning sonar head to which is attached a standard 971 sonar transmitter/receiver transducer (components 50a and 50b in FIG. 3), and the 971 standard processor (component 53 in FIG. 3). The Mesotech 971 standard transducer beam 54 is generally shown in FIG. 3 and has a range of about 100 meters. The Mesotech 971 processor also has the capability of generating two monitor on-screen cursors at any two positions on the sonar display even though no sonar object pips appear at said positions, and it can also generate a screen-displayed line joining or interconnecting said cursors. Other suitable sonar systems are also available for use in the subject invention.

Scanning sonar system 53 also provides further capabilities. For example, it will visually display any sea bottom obstructions in the way of the diver so that he is forewarned and can safely avoid them even though the underwater visibility may be zero. The use of this system would also permit the diver to locate and identify permanent submerged objects that may not but should appear on the "as built" maps of the area, so that these maps can be updated. Thus, there may be occasions when the sonar system 53 is used for these additional advantages while, at the same time, acoustic tracking system 33 is used for determining the diver's location. If the scanning sonar system 53, acoustic tracking system 33, and data base system 47 are all present and activated at the same time, their output signals are combined by signal combiner 35 to concurrently produce their respective three displays in overlaying or superposed fashion on the screens of shipboard monitor 34 and diver monitor 40. The deactivation of any of these systems 53, 33 or 47 will, of course, eliminate its display from the monitor screens.

Certain tasks may require that the dive support vessel 10 be under way rather than anchored, so as to follow a moving diver who is observing his progress with reference to map data displayed on the diver's monitor. For example, it may be necessary for the diver to travel some distance in order to locate a pipeline, or to move along a substantial part of its length while verifying that the pipeline is completely buried. Since the vessel's monitor 34 also displays the diver's real time location with reference to objects on a pipeline map, the crew can very efficiently operate the vessel to keep up with the diver, who, in effect, is leading the vessel during a "live boating" operation.

Many other modifications and variations of the present invention are possible considering the above teachings and specifications. For example, tracking, sonar and/or data base systems carried by the diver may be feasible for certain applications to avoid the need for a remote station. Therefore, within the scope of the appended claims, the invention may be practiced otherwise than as specifically described above.

I claim:

1. A method of providing visual aids to a diver in an underwater area for enabling said diver to navigate with reference to submerged objects within said area that are depicted in a pre-existing map of said underwater area, said map having been developed before said diver entered said underwater area, comprising the steps of:
   (a) determining the underwater location of said diver within said area;
   (b) generating a visible indicator of said diver underwater location;
   (c) producing a visible graphical representation of said map; and (d) concurrently displaying said visible diver location indicator and said visible map representation to said diver.

2. The method according to claim 1, wherein the underwater location of said diver is determined by detecting acoustic energy emitted from means carried by said diver.

3. The method according to claim 1, wherein the underwater location of said diver is determined by scanning said underwater area with sonar energy.

4. The method according to claim 1, wherein said visible diver location indicator is displayed as overlaying said visible map representation.

5. The method according to claim 4, wherein the underwater location of said diver is determined by detecting acoustic energy emitted from means carried by said diver.

6. The method according to claim 4, wherein the underwater location of said diver is determined by scanning said underwater area with sonar energy.

7. The method according to claim 6, which further includes the step of visually displaying to said diver a route between the displayed position of said visible diver location indicator at his starting underwater location and a selected point on said displayed visible map representation.

8. The method according to claim 7, wherein said route is displayed to said diver as a straight line.

9. A method of providing visual aids to a diver in an underwater area for enabling said diver to navigate with reference to submerged objects within said area that are depicted in a pre-existing map of said underwater area, said map having been developed before said diver entered said underwater area, comprising the steps of:
 (a) generating signals which indicate the underwater location of said diver within said area;
 (b) producing signals which represent said map;
 (c) combining said diver location signals and said map representation signals; and
 (d) converting said combined signals to a visible indicator of said diver location and to a visible graphical representation of said map which are concurrently displayed in superposed fashion to said diver.

10. The method according to claim 9, wherein said diver location signals are generated by detecting acoustic energy emitted from means carried by said diver.

11. The method according to claim 9, wherein said diver location signals are generated by scanning said underwater area with sonar energy.

12. The method according to claim 11, which further includes the step of visually displaying to said diver a route between the displayed position of said visible diver location indicator at his starting underwater location and a selected point on said displayed visible map representation.

13. The method according to claim 12, wherein said route is displayed to said diver as a straight line.

14. A method of providing visual aids to a diver in an underwater area for enabling said diver to navigate with reference to submerged objects within said area that are depicted in a pre-existing map of said underwater area, said map having been developed before said diver entered said underwater area, comprising the steps of:
 (a) generating signals at a remote station which indicate the underwater location of said diver within said area;
 (b) producing signals at said remote station which represent said map;
 (c) combining said diver location signals and said map representation signals at said remote station; and
 (d) converting said combined signals to a visible indicator of said diver location and to a visible graphical representation of said map which are concurrently displayed in superposed fashion to said diver.

15. The method according to claim 14, wherein said diver location signals are generated by detecting acoustic energy emitted from means carried by said diver.

16. The method according to claim 14, wherein said diver location signals are generated by scanning said underwater area with sonar energy.

17. The method according to claim 16, which further includes the step of visually displaying to said diver a route between the displayed position of said visible diver location indicator at his starting underwater location and a selected point on said displayed visible map representation.

18. The method according to claim 17, wherein said route is displayed to said diver as a straight line.

19. A system to provide visual aids to a diver in an underwater area for enabling said diver to navigate with reference to submerged objects within said area that are depicted, in a pre-existing map of said underwater area, said map having been developed before said diver entered said underwater area, comprising:
 (a) acoustic means for generating signals which indicate the underwater location of said diver within said area;
 (b) data base means for producing signals which represent said map;
 (c) means connected to said acoustic means and to said data base means for combining said diver location signals and said map representation signals; and
 (d) monitor means carried by said diver and connected to said combining means for converting said combined signals to a visible indicator of said diver location and to a visible graphical representation of said map which are concurrently displayed in superposed fashion on said monitor means.

20. The system according to claim 19, wherein said acoustic means includes a beacon carried by said diver to emit acoustic energy and a hydrophone for detecting said acoustic energy.

21. The system according to claim 19, wherein said acoustic means includes a transducer for scanning said underwater area with sonar energy.

22. The system according to claim 21, wherein said acoustic means further includes means for visually displaying on said monitor means a route between the displayed position of said visible diver location indicator at his starting underwater location and a selected point on said displayed visible map representation.

23. The system according to claim 22, wherein said route is displayed to said driver as a straight line.

24. A system to provide visual aids to a diver in an underwater area for enabling said diver to navigate with reference to submerged objects within said area that are depicted, in a pre-existing map of said underwater area, said map having been developed before said diver entered said underwater area, comprising:
 (a) beacon means carried by said diver to emit acoustic energy;

(b) hydrophone means for detecting said acoustic energy;

(c) a remote station;

(d) tracking means at said remote station and connected to said hydrophone means for generating signals which indicate the underwater location of said diver within said area;

(e) data base means at said remote station for producing signals which represent said map;

(f) means at said remote station and connected to said tracking means and to said data bases means for combining said diver location signals and said map representation signals; and (g) monitor means carried by said diver and connected to said combining means for converting said combined signals to a visible indicator of said diver location and to a visible graphical representation of said map which are concurrently displayed in superposed fashion on said monitor means.

25. The system according to claim 24, wherein said remote station further includes monitor means connected to said combining means for displaying the same diver and map information as displayed on said diver monitor means.

26. A system to provide visual aids to a diver in an underwater area for enabling said diver to navigate with reference to submerged objects within said area that are depicted, in a pre-existing map of said underwater area, said map having been developed before said diver entered said underwater area, comprising:

(a) transducer means for scanning said underwater area with sonar energy to generate sonar image signals of said diver;

(b) a remote station;

(c) processor means at said remote station and connected to said transducer means for processing said sonar image signals to indicate the underwater location of said diver within said area;

(d) data base means at said remote station for producing signals which represent said map;

(e) means at said remote station and connected to said processor means and to said data base means for combining said diver sonar image signals and said map representation signals; and (f) monitor means carried by said diver and connected to said combining means for converting said combined signals to a visible indicator of said diver location and to a visible graphical representation of said map which are concurrently displayed in superposed fashion on said monitor means.

27. The system according to claim 26, wherein said remote station further includes monitor means connected to said combining means for displaying the same diver and map information as displayed on said diver monitor means.

28. The system according to claim 26, wherein said processor means further provides signals to said diver monitor means for visually displaying thereon a route between the displayed position of said visible diver location indicator at his starting underwater location and a selected point on said displayed visible map representation.

29. The system according to claim 28, wherein said route is displayed as a straight line.

30. The system according to claim 26, wherein said processor means further provides cursor signals to said diver monitor means which visually mark a selected point on said displayed visible map representation.

31. A system to provide visual aids to a diver in an underwater area for enabling said diver to navigate with reference to submerged objects within said area that are depicted in a pre-existing map of said underwater area, said map having been developed before said diver entered said underwater area, comprising:

(a) means carried by said diver to emit acoustic energy;

(b) means for detecting said acoustic energy to generate signals which indicate the underwater location of said diver within said area;

(c) means for scanning said underwater area with sonar energy to generate signals which indicate the underwater location of submerged objects within said area;

(d) means for producing signals which represent said map;

(e) means for combining said diver location signals, said object location signals and said map representation signals; and (f) monitor means carried by said diver and connected to said combining means for converting said combined signals to visible indicators of said diver location and said object location, and to a visible graphical representation of said map, all of which are concurrently displayed in superposed fashion on said monitor means.

* * * * *